US012100346B2

(12) United States Patent
Dou et al.

(10) Patent No.: US 12,100,346 B2
(45) Date of Patent: Sep. 24, 2024

(54) PIXEL CIRCUIT AND EXTERNAL COMPENSATION METHOD

(71) Applicant: Shenzhen China Star Optoelectronics Semiconductor Display Technology Co., Ltd., Shenzhen (CN)

(72) Inventors: Wei Dou, Shenzhen (CN); Taijiun Hwang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/610,715

(22) PCT Filed: Oct. 11, 2021

(86) PCT No.: PCT/CN2021/123022
§ 371 (c)(1),
(2) Date: Nov. 12, 2021

(87) PCT Pub. No.: WO2023/050462
PCT Pub. Date: Apr. 6, 2023

(65) Prior Publication Data
US 2024/0054949 A1 Feb. 15, 2024

(30) Foreign Application Priority Data
Sep. 28, 2021 (CN) .......................... 202111145282.0

(51) Int. Cl.
*G09G 3/3208* (2016.01)

(52) U.S. Cl.
CPC ... *G09G 3/3208* (2013.01); *G09G 2300/0842* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 8,497,854 | B2 * | 7/2013 | Ogura | G09G 3/3275<br>345/212 |
| 9,378,678 | B1 * | 6/2016 | Lee | G09G 3/2003 |
| 10,515,588 | B2 * | 12/2019 | Yuan | G09G 3/3266 |
| 10,650,744 | B2 * | 5/2020 | Jin | G09G 3/3258 |
| 10,909,927 | B2 * | 2/2021 | Yin | G09G 3/3233 |
| 11,164,523 | B2 * | 11/2021 | Wang | G09G 3/3258 |

(Continued)

FOREIGN PATENT DOCUMENTS

| | | | |
|---|---|---|---|
| CN | 104821152 | A | 8/2015 |
| CN | 105047137 | A | 11/2015 |

(Continued)

*Primary Examiner* — Fred Tzeng
(74) *Attorney, Agent, or Firm* — Nathan & Associates Menachem Nathan

(57) ABSTRACT

The present disclosure discloses a pixel circuit and an external compensation method thereof. The external compensation method detects real-time source potentials of a driving transistor through n iterations, a single iterative detection time that can be set artificially to limit a time for each iteration to detect a real-time source potential of the driving transistor, until the real-time source potential of the driving transistor is equal to a target source potential, thereby improving threshold voltage detection efficiency of the driving transistor.

20 Claims, 5 Drawing Sheets

(56) References Cited

U.S. PATENT DOCUMENTS

| | | | | |
|---|---|---|---|---|
| 11,308,875 | B2 * | 4/2022 | Song | G09G 3/3233 |
| 11,308,889 | B2 * | 4/2022 | Song | G09G 3/3291 |
| 11,348,518 | B2 * | 5/2022 | Bao | G09G 3/3233 |
| 11,348,526 | B2 * | 5/2022 | Zhang | G09G 3/3258 |
| 11,562,699 | B2 * | 1/2023 | Park | G09G 3/3283 |
| 11,776,438 | B2 * | 10/2023 | Song | G09G 3/006<br>345/212 |
| 2019/0244568 | A1 * | 8/2019 | Ling | G09G 3/3233 |
| 2020/0273405 | A1 * | 8/2020 | Yang | G09G 3/3258 |
| 2021/0201826 | A1 | 7/2021 | Woo et al. | |

FOREIGN PATENT DOCUMENTS

| | | | |
|---|---|---|---|
| CN | 105513536 | A | 4/2016 |
| CN | 106531078 | A | 3/2017 |
| CN | 106935192 | A | 7/2017 |
| CN | 107093403 | A | 8/2017 |
| CN | 108257554 | A | 7/2018 |
| CN | 109599060 | A | 4/2019 |
| CN | 109658880 | A | 4/2019 |
| CN | 110473501 | A | 11/2019 |
| CN | 110827763 | A | 2/2020 |
| CN | 112071265 | A | 12/2020 |
| CN | 112201207 | A | 1/2021 |
| CN | 112365848 | A | 2/2021 |
| CN | 112466246 | A | 3/2021 |
| CN | 113284462 | A | 8/2021 |
| CN | 113284466 | A | 8/2021 |
| JP | 2010060868 | A | 3/2010 |

* cited by examiner

PIXEL CIRCUIT AND EXTERNAL COMPENSATION METHOD

BACKGROUND OF DISCLOSURE

Field of Disclosure

The present disclosure relates to a field of display technology, and in particular to a pixel circuit and an external compensation method thereof.

Description of Prior Art

In a conventional pixel circuit, a threshold voltage (Vth) of a driving transistor is detected. Generally, the driving transistor is given an initial gate-source voltage (Vgs) greater than the Vth, a gate voltage of the driving transistor is kept unchanged by a source-following manner, and a source voltage of the driving transistor is raised to Vgs=Vth, at which time a current flowing through the driving transistor approaches zero. In this state, the source voltage of the driving transistor is sampled, the Vth is calculated, and then the Vth acquired is superimposed on a data voltage for display, thereby realizing compensation for a Vth difference, and eliminating luminance display unevenness caused by the Vth difference.

However, as the Vgs in detection decreases and a parasitic capacitance of a detection line is much greater than a storage capacitance of a single pixel circuit, the source voltage of the driving transistor rises more and more slowly, so that a detection for the Vth difference of the driving transistor will take a long time.

It should be noted that the above introduction of the background technology is merely intended to facilitate a clear and complete understanding of technical solutions of the present disclosure. Therefore, it cannot be considered that the above-described technical solutions involved are well known to those skilled in the art merely because they appear in the background technology of the present disclosure.

SUMMARY OF DISCLOSURE

A pixel circuit and an external compensation method thereof are provided in the present disclosure in order to alleviate a technical problem of low threshold voltage detection efficiency of a driving transistor.

In one aspect, the present disclosure provides an external compensation method for a pixel circuit, comprising: determining a target source potential of a driving transistor in the pixel circuit and a single iterative detection time; detecting a real-time source potential of the driving transistor through n iterations until the real-time source potential of the driving transistor is equal to a target source potential, and n being a positive integer; determining an (n−1)-th compensation voltage based on the target source potential and real-time source potentials detected in a first to an (n−1)-th iterations; and compensating the driving transistor according to the (n−1)-th compensation voltage.

In some embodiments, the step of determining the (n−1)-th compensation voltage based on the target source potential and the real-time source potentials detected in the first to the (n−1)-th iterations comprises: determining an (n−1)-th threshold-like voltage based on a difference between the target source potential and the real-time source potential detected in the (n−1)-th iteration; and acquiring the (n−1)-th compensation voltage based on an accumulated sum of an initial threshold-like voltage to the (n−1)-th threshold-like voltage.

In some embodiments, if the real-time source potential of the driving transistor detected in the n-th iteration is equal to the target source potential, a potential of an (n+1)-th data signal is same as a potential of an n-th data signal.

In some embodiments, a potential of data signals during precharge stages and iterative detecting stages in an (n+1)-th and subsequent iterations is same as the potential of the n-th data signal.

In some embodiments, the external compensation method further comprises determining an initial gate potential of the driving transistor and an initial source potential of the driving transistor, and setting a difference between the initial gate potential and the initial source potential greater than a threshold voltage of the driving transistor.

In some embodiments, the external compensation method further comprises: determining an initial gate potential of the driving transistor and an initial source potential of the driving transistor, and setting a difference between the target source potential and the initial source potential to be greater than zero.

In some embodiments, the target source potential is greater than or equal to 0V, and less than or equal to 16V.

In some embodiments, the single iterative detection time is greater than or equal to Oms and less than or equal to 29 ms.

In some embodiments, the single iterative detection time is greater than or equal to 0.5 ms and less than or equal to 20 ms.

In a second aspect, the present disclosure provides a pixel circuit, comprising: a driving transistor, and an external compensation module electrically connected to the driving transistor for determining an initial gate potential of the driving transistor, an initial source potential of the driving transistor, a target source potential of the driving transistor, and a single iterative detection time, wherein a gate potential of the driving transistor is same as a potential of a data signal within a same single iterative detection time; the real-time source potential of the driving transistor is detected through n iterations until the real-time source potential of the driving transistor is equal to the target source potential, and n is a positive integer; a (n−1)-th compensation voltage is detected based on the target source potential, the real-time source potentials detected in a first to an (n−1)-th iterations; and the (n−1)-th compensation voltage is superimposed on a potential of an (n−1)-th data signal to generate an n-th data signal, and the n-th data signal is a data signal detected in an n-th iteration.

The pixel circuit and the external compensation method thereof provided in the present disclosure detects the real-time source potential of the driving transistor through n iterations, and limits a time for detecting the real-time source potential of the driving transistor in each iteration by an artificial single iterative detection time until the real-time source potential of the driving transistor is equal to the target source potential, thereby improving threshold voltage detection efficiency of the driving transistor. The (n−1)-th compensation voltage is superimposed on the potential of the (n−1)-th data signal to generate the n-th data signal, which can improve threshold voltage compensation efficiency of the driving transistor, and thereby improving luminance display uniformity of the pixel circuit.

DETAILED DESCRIPTION OF EMBODIMENTS

In order to make purposes, technical solutions, and effects of the present disclosure clearer, the following further describes the present disclosure in detail with reference to the accompanying drawings and embodiments. It should be understood that specific embodiments described herein are only used to explain the present disclosure and are not used to limit the present disclosure.

Figure 1:
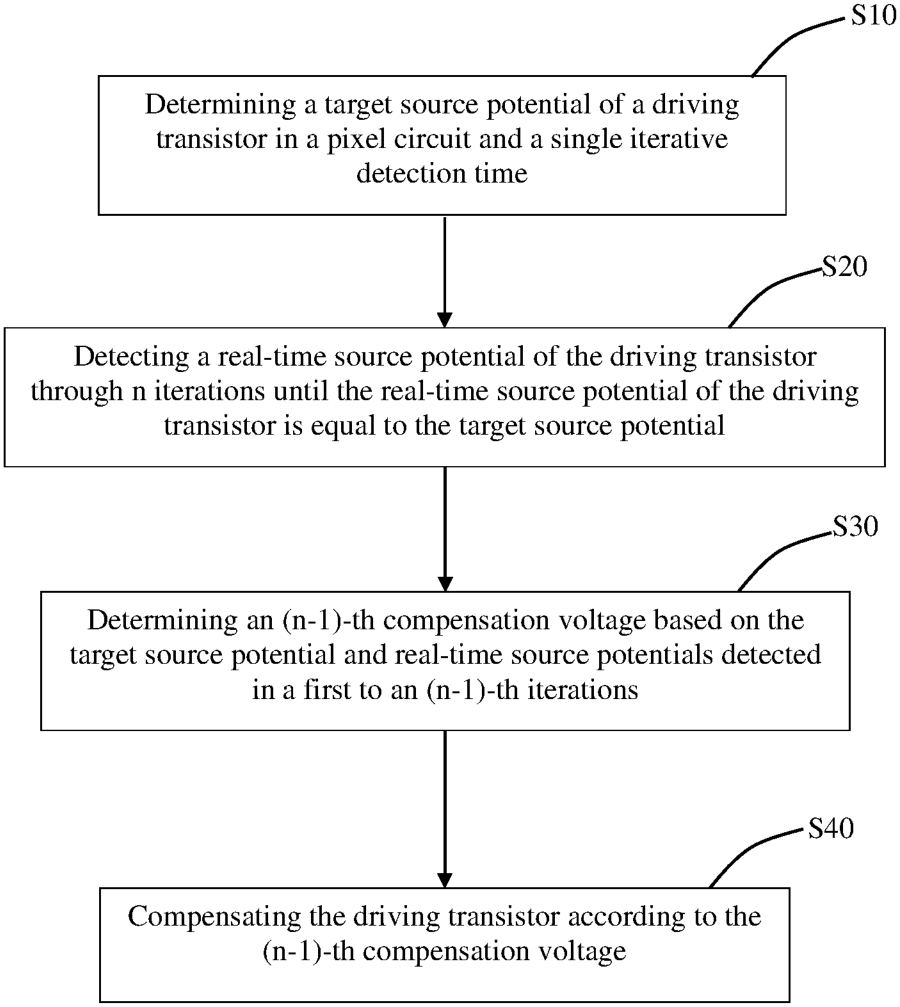
FIG. 1 is a flow chart of an external compensation method according to an embodiment of the present disclosure.

Referring to FIGS. 1 to 7, as shown in FIG. 1, this embodiment provides an external compensation method for a pixel circuit, which comprises following steps:

In step S10, a target source potential of a driving transistor in the pixel circuit and a single iterative detection time are determined.

In step S20, a real-time source potential of the driving transistor is detected through n iterations until the real-time source potential of the driving transistor is equal to the target source potential, and n is a positive integer.

In step S30, an (n−1)-th compensation voltage is determined based on the target source potential and the real-time source potentials detected in a first to an (n−1)-th iterations.

In step S40, the driving transistor is compensated according to the (n−1)-th compensation voltage.

It can be understood that in the external compensation method provided in this embodiment, the real-time source potential of the driving transistor is detected through n iterations, and a time for detecting the real-time source potential of the driving transistor in each iteration can be set by an artificial single iterative detection time, until the real-time source potential of the driving transistor is equal to the target source potential, thereby improving threshold voltage detection efficiency of the driving transistor. An n-th data signal is generated by superimposing the (n−1)-th compensation voltage on a potential of an (n−1)-th data signal, then threshold voltage compensation efficiency of the driving transistor can be improved, and luminance display uniformity of the pixel circuit is improved.

Figure 2:
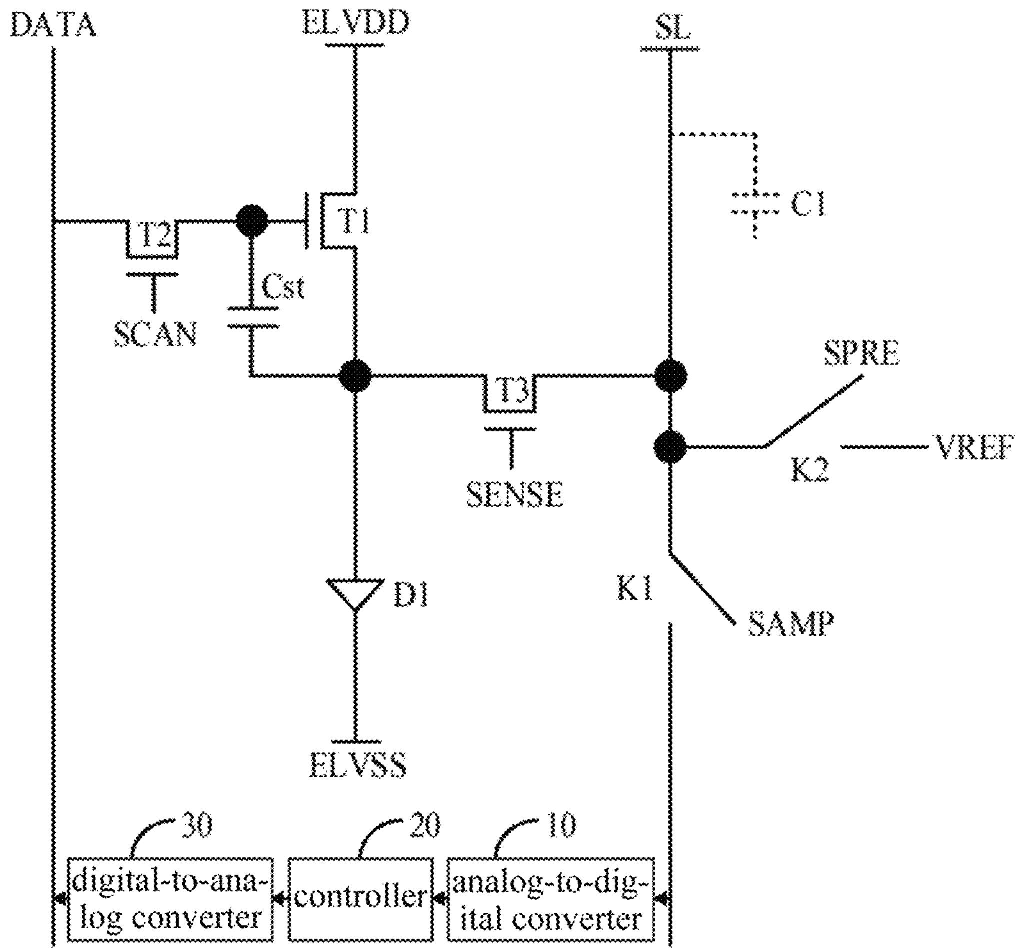
FIG. 2 is a circuit principle diagram of a pixel circuit according to an embodiment of the present disclosure.

In a pixel circuit shown in FIG. 2, a drain of a driving transistor T1 is connected to a positive power supply signal ELVDD, a gate of the driving transistor T1 is electrically connected to one end of a storage capacitor Cst and one of a source or a drain of a writing transistor T2, another one of the source or the drain of the writing transistor T2 is connected to a data signal DATA, a gate of the writing transistor T2 is connected to a scan signal SCAN, a source of the driving transistor T1 is electrically connected to one of a source or a drain of a sensing transistor T3, another end of the storage capacitor Cst, and an anode of a light-emitting device D1; a cathode of the light-emitting device D1 is used to connect to a negative power supply signal ELVSS, a gate of the sensing transistor T3 is used to connect to a sensing signal SENSE, and another one of the source or the drain of the sensing transistor T3 is electrically connected to a sensing line SL. The sensing line SL is electrically connected to one end of a control switch K1 and one end of a control switch K2, another end of the control switch K1 is electrically connected to an input terminal of an analog-to-digital converter 10, an output terminal of the analog-to-digital converter 10 is electrically connected to an input terminal of a controller 20, an output terminal of the controller 20 is electrically connected to an input terminal of a digital-to-analog converter 30, an output terminal of the digital-to-analog converter 30 is used to output a corresponding data signal DATA, a control terminal of the control switch K1 is used to connect to a sampling control signal SAMP, another end of the control switch K2 is used to connect to a reference signal VREF, and a control terminal of the control switch K2 is used to connect to a control signal SPRE. The sensing line SL has a parasitic capacitor C1, and a capacitance of the parasitic capacitor C1 is much greater than a capacitance of the storage capacitor Cst.

Wherein, an external compensation module may comprise the analog-to-digital converter 10, the controller 20, and the digital-to-analog converter 30. The external compensation module may further comprise the control switch K1 and the control switch K2. The external compensation module may be presented in a form of an integrated circuit or a chip, so that an area or a volume of the external compensation module may be reduced, and a space occupied by the external compensation module may be reduced.

Wherein, the light-emitting device D1 may be, but is not limited to, an organic light-emitting diode (OLED), the light-emitting device D1 may also be a mini-LED or a micro-LED.

The external compensation module may be configured to determine an initial gate potential of the driving transistor, an initial source potential of the driving transistor, a target source potential of the driving transistor, and a single iterative detection time, wherein a gate potential of the driving transistor is same as a potential of the data signal within a same single iterative detection time. A real-time source potential of the driving transistor is determined through n iterations until the real-time source potential of the driving transistor is equal to the target source potential, and n is a positive integer. An (n−1)-th compensation voltage is determined based on the target source potential and the real-time source potentials detected in a first to an (n−1)-th iterations. The (n−1)-th compensation voltage is superimposed on a potential of an (n−1)-th data signal to generate an n-th data signal, and the n-th data signal is a data signal in an n-th iterative detection.

It can be understood that the external compensation module provided in this embodiment detects the real-time source potential of the driving transistor through n iterations, and limits a time for detecting the real-time source potential of the driving transistor in each iteration by setting an artificial single iterative detection time until the real-time source potential of the driving transistor is equal to the target source potential, thereby improving threshold voltage detection efficiency of the driving transistor. The external compensation module provided in this embodiment superimposes the (n−1)-th compensation voltage on the potential of the (n−1)-th data signal to generate the n-th data signal, which can improve threshold voltage compensation efficiency of the driving transistor, and thereby improving luminance display uniformity of the pixel circuit.

Figure 3:
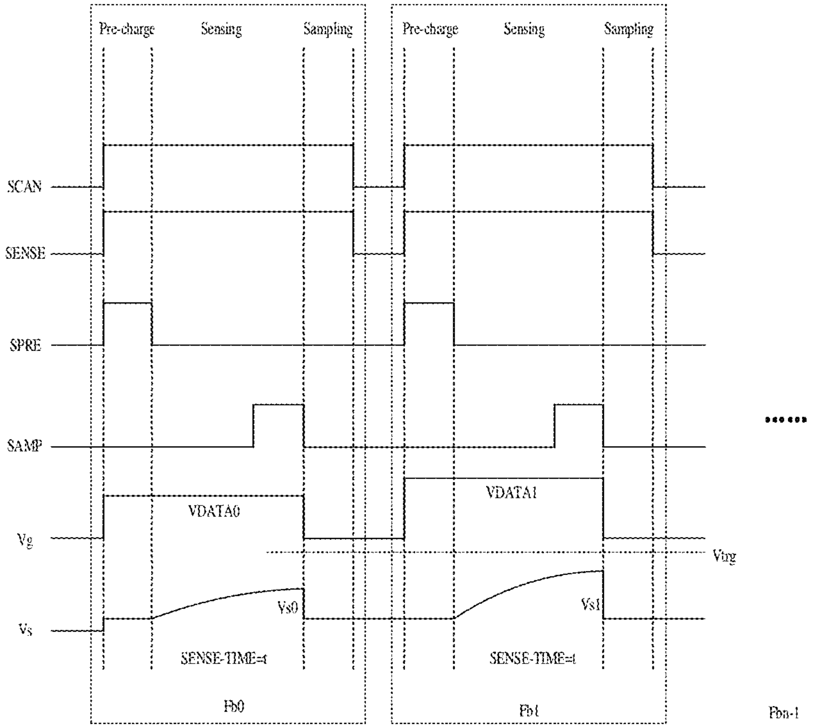
FIG. 3 is a timing diagram of the pixel circuit shown in FIG. 2.

As shown in FIG. 3, the external compensation method provided by the present disclosure may comprise a plurality of iterative detection processes, for example, a first iterative detection process Fb0, a second iterative detection process Fb1 to an n-th iterative detection process Fbn−1, and each iterative detection process may comprise following stages:

A pre-charge stage (Pre-charge): the scan signal SCAN, the sensing signal SENSE, and the control signal SPRE are all high potential; the writing transistor T2, the sensing transistor T3, and the control switch K2 are all turned on; the potential of the data signal is written to the gate potential Vg of the driving transistor, and the potential of the reference signal VREF is written to the real-time source potential Vs of the driving transistor, and Vg−Vs>Vth, which ensures that the driving transistor can be turned on, wherein the Vth is a threshold voltage of the driving transistor.

Detecting stage (Sensing): the writing transistor T2 and the sensing transistor T3 maintain the turn-on state, and Vg=VDATA; the control signal SPRE is low potential and the control switch K2 is turned off, at this time, the sensing line SL is in a floating state, and a luminescent current flowing through the driving transistor T1 and the sensing transistor T3 can charge the parasitic capacitor C1 of the sensing line SL, and correspondingly, the real-time source potential Vs of the driving transistor rises.

Sampling stage (Sampling): when a time for the detecting stage SENSE-TIME reaches a given single iterative detection time t, the sampling control signal SAMP turns on the control switch K1, and the analog-to-digital converter 10 samples the real-time source potential Vs of the driving transistor.

In the present disclosure, since the single iterative detection time t can be freely set, in a case where the single iterative detection time t is greater than or equal to 0 millisecond (ms) and less than or equal to 29 ms, the single iterative detection time t is already smaller than a conventional detection time of 30 ms, thereby improving the threshold voltage detection efficiency of the driving transistor T1.

Specifically, the single iterative detection time t may be greater than or equal to 0.5 ms and less than or equal to 20 ms, which can further improve the threshold voltage detection efficiency of the driving transistor T1. For example, the single iterative detection time t may be a nature number of milliseconds within a range, such as 0.8 ms, 1 ms, 0.8 ms, 1.2 ms, 1.5 ms, 0.8 ms, 2 ms, 4.5 ms, 6 ms, 8 ms, 10 ms, or the like.

Table 1 below shows a variation of each potential in each iterative detection:

| n | VDATA | Vs | VTHS | ΔV |
|---|---|---|---|---|
| Fb0 | VDATA0 = Vg0 | Vs0 | VTHS0 = Vtrg − Vs0 | ΔV0 = VTHS0 |
| Fb1 | VDATA1 = VDATA0 + ΔV0 | Vs1 | VTHS1 = Vtrg − Vs1 | ΔV1 = VTHS0 + VTHS1 |
| Fb2 | VDATA2 = VDATA1 + ΔV1 | Vs2 | VTHS2 = Vtrg − Vs2 | ΔV2 = VTHS0 + VTHS1 + VTHS2 |
| . . . | . . . | . . . | . . . | . . . |
| Fbn | VDATAn = VDATAn − 1 + ΔVn − 1 | Vsn | VTHSn = Vtrg − Vsn | ΔVn = VTHS0 + VTHS1 + VTHS2 + . . . + VTHSn |

Wherein n is the number of iterative detections, VDATA is the potential of the data signal, Vs is the real-time source potential of the driving transistor T1, VTHS is a threshold-like voltage of the driving transistor T1, ΔV is the compensation voltage, and Vtrg is the target source potential. Wherein, ΔVn is an n-th compensation voltage, and ΔVn−1 is an (n−1)-th compensation voltage.

In a detecting stage of the first iterative detection process Fb0, a first gate potential Vg0 of the driving transistor T1 is a potential VDATA0 of a first data signal, and a real-time source potential acquired correspondingly by the first iterative detection is Vs0.

In a detecting stage of the second iterative detection process Fb1, a second gate potential Vg1 of the driving transistor T1 is a potential VDATA1 of a second data signal, and a real-time source potential acquired correspondingly by the second iterative detection is Vs1. Wherein, Vs1 is greater than Vs0, and VDATA1 is greater than VDATA0.

In a detecting stage of a third iterative detection process Fb2, a third gate potential Vg2 of the driving transistor T1 is a potential VDATA2 of a third data signal, and a real-time source potential acquired correspondingly by the third iterative detection is Vs2. Wherein, Vs2 is greater than Vs1, and VDATA2 is greater than VDATA1.

By analogy, in a detecting stage of the n-th iterative detection process Fbn, an n-th gate potential Vgn of the driving transistor T1 is a potential VDATAn of an n-th data signal, and a real-time source potential acquired correspondingly by the n-th iterative detection is Vsn.

This is repeated until the real-time source potential Vs of the driving transistor T1 rises to the target source potential Vtrg. At this time, VTHSn=0V is calculated and the iterative detection is continued, and when the gate potential Vg of the driving transistor T1 no longer changes, at this time, VTHS0+VTHS1+VTHS2+ . . . +VTHSn is equal to ΔVn. A difference between compensation voltages of driving transistors in different pixel circuits is a difference between threshold voltages of the different driving transistors. By superimposing the compensation voltages ΔVn or ΔVn−1 corresponding to the driving transistors to corresponding data signals, the luminance display unevenness caused by the difference between the threshold voltages of the different driving transistors can be eliminated.

Figure 4:
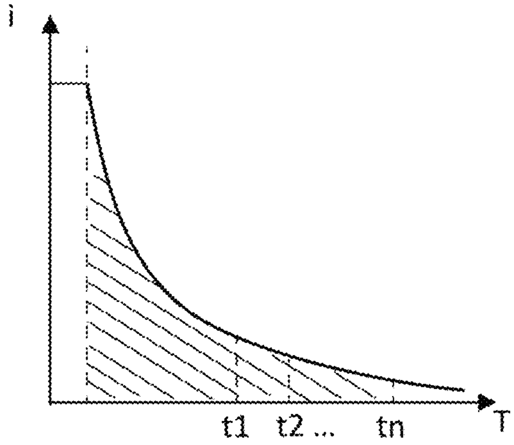
FIG. 4 is a schematic diagram of a current characteristic of a real-time source potential according to an embodiment of the present disclosure.

A shaded area shown in FIG. 4 can be used to characterize rising magnitude of the real-time source potential Vs of the driving transistor T1. As time T increases, current i flowing through the driving transistor T1 decreases. For example, the current i corresponding to time t1 is greater than the current i corresponding to time t2, and the current i corresponding to time t2 is greater than the current i corresponding to time tn, until the current i approaches zero at an infinite distance of time, and the real-time source potential Vs of the driving transistor T1 tends to be stable.

Figure 5:
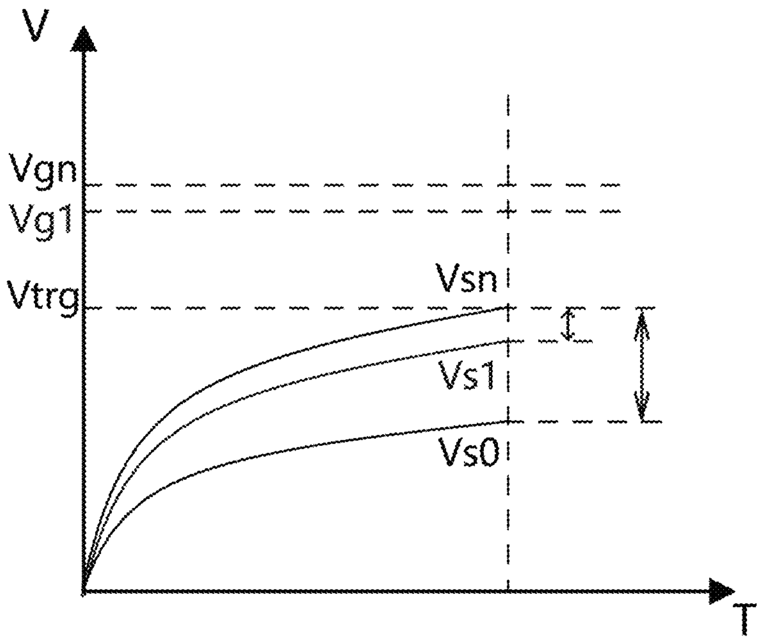
FIG. 5 is a schematic diagram of a real-time source potential variation over time according to an embodiment of the present disclosure.

As shown in FIG. 5, as the time T increases, the real-time source potentials Vs0, Vs1 and Vsn of the driving transistor T1 are gradually raised until the target source potential is reached. During this process, the gate potentials Vg1, Vgn of the driving transistor T1 are also gradually increased.

Figure 6:
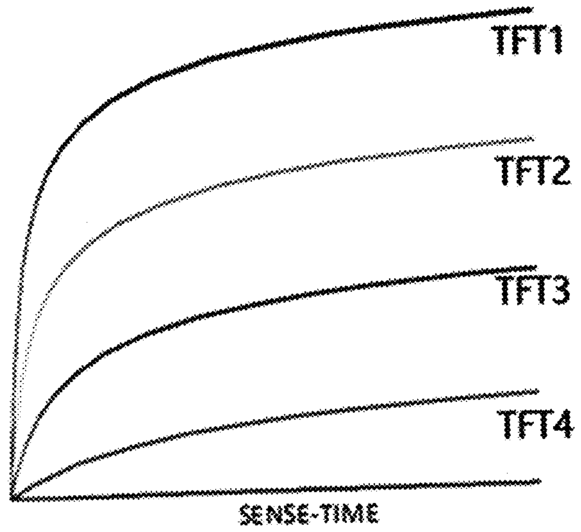
FIG. 6 is a schematic diagram of different driving transistors with different threshold voltages in an initial detection according to an embodiment of the present disclosure.

As shown in FIG. 6, in a first single iterative detection time SENSE-TIME, since the threshold voltages of the driving transistors do not coincide, the detected real-time source potentials of the driving transistors are also different. For example, a real-time source potential of the driving transistor TFT1 is higher than a real-time source potential of the driving transistor TFT2, the real-time source potential of the driving transistor TFT2 is higher than a real-time source potential of the driving transistor TFT3, and the real-time source potential of the driving transistor TFT3 is higher than a real-time source potential of the driving transistor TFT4. Therefore, one or more iterative detection is required to detect the threshold voltage differences of the driving transistors completely.

Figure 7:
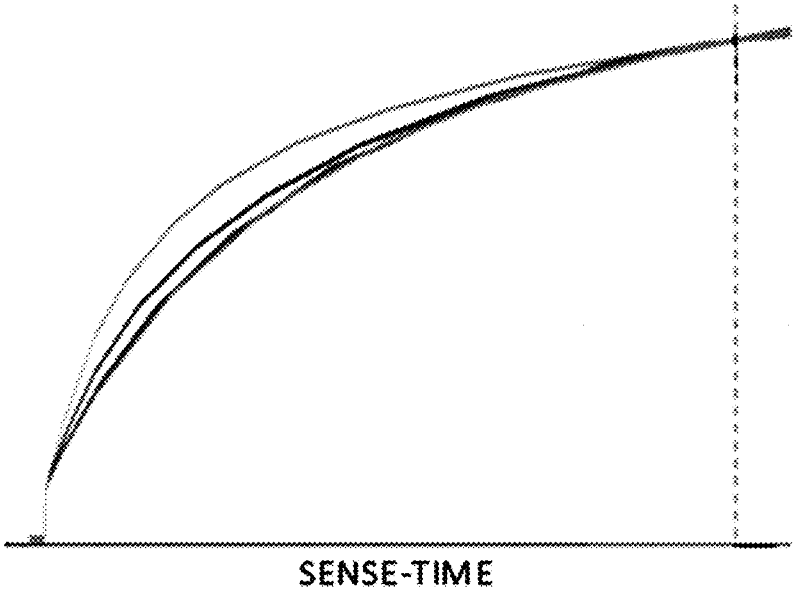
FIG. 7 is a schematic diagram of different driving transistors with a uniform threshold voltage as the number of iterative detections increase according to an embodiment of the present disclosure.

As shown in FIG. 7, as the number of iterative detection times increases, the real-time source potential of each driving transistor gradually tends to a same target source potential. In this case, the acquired compensation voltages can sufficiently reflect the threshold voltage differences of the driving transistors, and thus the compensation voltages can be used to compensate the potentials of the data signals connected to corresponding pixel circuits, which can eliminate the threshold voltage differences existing between different driving transistors, and achieve the luminance display uniformity of the display panel.

Specifically, for example, a same display panel comprises a first sub-pixel including a first driving transistor whose threshold voltage is a first threshold voltage Vth1, and a second sub-pixel including a second driving transistor whose threshold voltage is a second threshold voltage Vth2. After a plurality of iterative detections, until a real-time source potential of the first driving transistor and a real-time source potential of the second driving transistor are both raised to a target source potential, a compensation voltage ΔV1 corresponding to the first driving transistor and a compensation voltage ΔV2 corresponding to the second driving transistor are obtained. In this case, a difference between the compensation voltage ΔV1 and the compensation voltage ΔV2 is equal to a difference between the first threshold voltage Vth1 and the second threshold voltage Vth2.

A luminescent current formula is then given by following Formula 1:

$$Ids=\mu*W*Cox*(Vgs-Vth)^2/2L \quad (1)$$

Wherein, Ids is the luminescent current flowing through the driving transistor, p is a mobility of the driving transistor, W is a channel width of the driving transistor, L is a channel length of the driving transistor, Cox is a dielectric constant, Vgs is a gate-source voltage difference of the driving transistor, and Vth is the threshold voltage of the driving transistor. A luminescent current Ids1 of the first driving transistor can be obtained as follows:

$$Ids1=\mu*W*Cox*(Vg+\Delta V1-Vs-Vth1)^2/2L \quad (2)$$

Similarly, a luminescent current Ids2 of the second driving transistor can be obtained as follows:

$$Ids2=\mu*W*Cox*(Vg+\Delta V2-Vs-Vth2)^2/2L \quad (3)$$

According to Formula 2 and Formula 3, a gate potential Vg of the first driving transistor and the real-time source potential Vs of the first driving transistor are consistent with a gate potential Vg of the second driving transistor and the real-time source potential Vs of the second driving transistor, respectively. Therefore, when ΔV1−ΔV2=Vth1−Vth2, that is, ΔV1−Vth1=ΔV2−Vth2, the luminescent current Ids1 of the first driving transistor is same as the luminescent current Ids2 of the second driving transistor, the display brightness of the first sub-pixel is same as the display brightness of the second sub-pixel. Similarly, the display brightness of a plurality of sub-pixels can be compensated to a same display brightness by the scheme provided in the present disclosure.

In one of the embodiments, the target source potential is greater than or equal to 0V and less than or equal to 16V. For example, the target source potential may be 5V, 8V, 12V, 15V, or the like. Here, as the target source potential increases, a charging rate of the parasitic capacitor C1 becomes faster, so that the single iterative detection time can be reduced.

In one of the embodiments, the step of determining the (n−1)-th compensation voltage based on the target source potential and the real-time source potentials detected in the first to the (n−1)-th iterations comprises: determining an (n−1)-th threshold-like voltage based on differences between the target source potential and the real-time source potential detected in the (n−1)-th iteration; and acquiring the (n−1)-th compensation voltage based on an accumulated sum of an initial threshold-like voltage to the (n−1)-th threshold-like voltage.

In one of the embodiments, if the real-time source potential of the driving transistor in the n-th iterative detection is equal to the target source potential, a potential of an (n+1)-th data signal is same as the potential of the n-th data signal.

In one of the embodiments, a potential of data signals during pre-charge stages and detecting stages in an (n+1)-th and subsequent iterations is same as the potential of the n-th data signal.

In one of the embodiments, the external compensation method further comprises determining the initial gate potential of the driving transistor and the initial source potential of the driving transistor; setting a difference between the initial gate potential and the initial source potential to be greater than the threshold voltage of the driving transistor. The initial gate potential may be a gate potential in the first iterative detection, and the initial source potential may be a real-time source potential in the first iterative detection.

In one of the embodiments, the external compensation method further comprises determining the initial gate potential of the driving transistor and the initial source potential of the driving transistor, and setting the difference between the target source potential and the initial source potential to be greater than zero.

It will be understood that those skilled in the art may make equivalent replacements or changes in accordance with technical solutions of the present disclosure and the inventive concepts thereof, all of which shall fall within the scope of the claims appended hereto.

What is claimed is:

1. An external compensation method for a pixel circuit, comprising:

determining a target source potential of a driving transistor in the pixel circuit and a single iterative detection time;

detecting a real-time source potential of the driving transistor through n iterations until the real-time source potential of the driving transistor is equal to the target source potential, and n is a positive integer;

determining an (n−1)-th compensation voltage based on the target source potential and real-time source potentials detected in a first to an (n−1)-th iterations; and compensating the driving transistor according to the (n−1)-th compensation voltage.

2. The external compensation method according to claim 1, wherein the step of determining the (n−1)-th compensation voltage based on the target source potential and the real-time source potentials detected in the first to the (n−1)-th iterations comprises:

determining an (n−1)-th threshold-like voltage based on a difference between the target source potential and the real-time source potential detected in the (n−1)-th iteration; and acquiring the (n−1)-th compensation voltage based on an accumulated sum of an initial threshold-like voltage to the (n−1)-th threshold-like voltage.

3. The external compensation method according to claim 2, wherein if the real-time source potential of the driving transistor detected in an n-th iteration is equal to the target source potential, a potential of an (n+1)-th data signal is same as a potential of an n-th data signal.

4. The external compensation method according to claim 3, wherein a potential of data signals during pre-charge stages and iterative detecting stages in an (n+1)-th and subsequent iterations is same as the potential of the n-th data signal.

5. The external compensation method according to claim 1, wherein the external compensation method further comprises:

determining an initial gate potential of the driving transistor and an initial source potential of the driving transistor; and setting a difference between the initial gate potential and the initial source potential to be greater than a threshold voltage of the driving transistor.

6. The external compensation method according to claim 1, wherein the external compensation method further comprises:

determining an initial gate potential of the driving transistor and an initial source potential of the driving transistor; and setting a difference between the target source potential and the initial source potential to be greater than zero.

7. The external compensation method according to claim 1, wherein the single iterative detection time is greater than or equal to Oms and less than or equal to 29 ms.

8. The external compensation method according to claim 7, wherein the single iterative detection time is greater than or equal to 0.5 ms and less than or equal to 20 ms.

9. An external compensation method for a pixel circuit, comprising:

determining a target source potential of a driving transistor in the pixel circuit and a single iterative detection time, and the target source potential is greater than or equal to 0V and less than or equal to 16V;

detecting a real-time source potential of the driving transistor through n iterations until the real-time source potential of the driving transistor is equal to the target source potential, and n is a positive integer;

determining an (n−1)-th compensation voltage based on the target source potential and real-time source potentials detected in a first to an (n−1)-th iterations; and compensating the driving transistor according to the (n−1)-th compensation voltage.

10. The external compensation method according to claim 9, wherein the step of determining the (n−1)-th compensation voltage based on the target source potential and the real-time source potentials detected in the first to the (n−1)-th iterations comprises:

determining an (n−1)-th threshold-like voltage based on a difference between the target source potential and the real-time source potentials detected in the (n−1)-th iteration; and acquiring the (n−1)-th compensation voltage based on an accumulated sum of an initial threshold-like voltage to the (n−1)-th threshold-like voltage.

11. The external compensation method according to claim 10, wherein if the real-time source potential of the driving transistor detected in an n-th iteration is equal to the target source potential, a potential of an (n+1)-th data signal is same as a potential of an n-th data signal.

12. The external compensation method according to claim 11, wherein a potential of data signals during pre-charge stages and iterative detecting stages in an (n+1)-th and subsequent iterations is same as the potential of the n-th data signal.

13. The external compensation method according to claim 9, wherein the external compensation method further comprises:

determining an initial gate potential of the driving transistor and an initial source potential of the driving transistor; and setting a difference between the initial gate potential and the initial source potential to be greater than a threshold voltage of the driving transistor.

14. The external compensation method according to claim 9, wherein the external compensation method further comprises:

determining an initial gate potential of the driving transistor and an initial source potential of the driving transistor; and setting a difference between the target source potential and the initial source potential to be greater than zero.

15. The external compensation method according to claim 9, wherein the single iterative detection time is greater than or equal to Oms and less than or equal to 29 ms.

16. The external compensation method according to claim 15, wherein the single iterative detection time is greater than or equal to 0.5 ms and less than or equal to 20 ms.

17. A pixel circuit, comprising:

a driving transistor; and an external compensation module, electrically connected to the driving transistor for determining an initial gate potential of the driving transistor, an initial source potential of the driving transistor, a target source potential of the driving transistor, and a single iterative detection time, wherein a gate potential of the driving transistor is same as a potential of a data signal within a same single iterative detection time; the real-time source potential of the driving transistor is detected through n iterations until the real-time source potential of the driving transistor is equal to the target source potential, and n is a positive integer; an (n−1)-th compensation voltage is determined based on the target source potential and the real-time source potentials detected in a first to an (n−1)-th iterations; and the (n−1)-th compensation voltage is superimposed on a potential of an (n−1)-th data signal to generate an n-th data signal, and the n-th data signal is a data signal detected in an n-th iteration.

18. The pixel circuit according to claim 17, wherein the pixel circuit further comprises:

a sensing transistor, one of a source or a drain of the sensing transistor is electrically connected to a source of the driving transistor, and a gate of the sensing transistor is used to connect to a sensing signal;

a sensing line, electrically connected to another one of the source or the drain of the sensing transistor; and a control switch, one end of the control switch is electrically connected to the sensing line, and a control terminal of the control switch is used to connected to a sampling control signal.

19. The pixel circuit according to claim 18, wherein the external compensation module comprises:

an analog-to-digital converter, an input terminal of the analog-to-digital converter is electrically connected to another end of the control switch;

a controller, an input terminal of the controller is electrically connected to an output terminal of the analog-to-digital converter; and a digital-to-analog converter, an input terminal of the digital-to-analog converter is electrically connected to an output terminal of the controller.

20. The pixel circuit according to claim 19, wherein the pixel circuit further comprises:

a writing transistor, one of a source or a drain of the writing transistor is electrically connected to the gate of the driving transistor, and another one of the source or the drain of the writing transistor is electrically connected to an output terminal of the digital-to-analog converter.

* * * * *